(12) United States Patent
Winick

(10) Patent No.: US 6,999,562 B2
(45) Date of Patent: Feb. 14, 2006

(54) SECURITY CONTROL AND COMMUNICATION SYSTEM AND METHOD

(75) Inventor: Steven J. Winick, Woodmere, NY (US)

(73) Assignee: Honeywell International Inc., Morristown, NJ (US)

( * ) Notice: Subject to any disclaimer, the term of this patent is extended or adjusted under 35 U.S.C. 154(b) by 267 days.

(21) Appl. No.: 10/410,463

(22) Filed: Apr. 9, 2003

(65) Prior Publication Data

US 2003/0190906 A1    Oct. 9, 2003

Related U.S. Application Data

(60) Provisional application No. 60/370,619, filed on Apr. 9, 2002.

(51) Int. Cl.
*H04M 11/04*      (2006.01)
(52) U.S. Cl. .................... 379/42; 379/37; 455/404.01; 340/531; 340/532
(58) Field of Classification Search ............ 379/37–51; 340/506–508, 531–533, 539.1, 539.11, 539.14–539.16, 340/539.19; 455/404.1, 418, 419
See application file for complete search history.

(56) References Cited

U.S. PATENT DOCUMENTS

| | | | | |
|---|---|---|---|---|
| 5,134,644 A | * | 7/1992 | Garton et al. ................. | 379/39 |
| 5,365,568 A | * | 11/1994 | Gilbert ......................... | 379/43 |
| 5,568,535 A | * | 10/1996 | Sheffer et al. ................ | 379/39 |
| 5,625,338 A | | 4/1997 | Pildner et al. | |
| 5,850,180 A | | 12/1998 | Hess | |
| 6,075,451 A | * | 6/2000 | Lebowitz et al. ...... | 340/539.19 |
| 6,441,731 B1 | | 8/2002 | Hess | |
| 2001/0050976 A1 | * | 12/2001 | Simon et al. ................. | 379/39 |

* cited by examiner

*Primary Examiner*—Wing Chan
(74) *Attorney, Agent, or Firm*—Scully, Scott, Murphy & Presser

(57) ABSTRACT

An integrated security control system and method which integrate the functions of a wireless security system control panel and a radio transceiver in an integrated security control system unit. The integrated control unit includes a first telephone communication system for communicating security system data by wired telephone communications, and a second radio frequency (RF) cellular communication system for communicating security system data by communications through an RF communication network. The cellular communication system is the primary communication network for reporting a security event, thereby leaving the first telephone communication system open for telephone communications during the reporting of a security event. A separate unit of the security system, such as a wireless RF status display or a wireless RF keypad, is provided with a beeper transducer for sounding entry and exit beeps. The separate unit is positioned at a separate location from the integrated security control system unit, such that the entry beeps do not alert an entering person to the location of the integrated security control system unit. When a security event is triggered, the control unit delays activating a security alarm sounder in the control unit until after the second RF communication system has finished transmitting the alarm message.

31 Claims, 3 Drawing Sheets

SECURITY CONTROL AND COMMUNICATION SYSTEM AND METHOD

This application claims the benefit of Provisional application No. 60/370,619, filed Apr. 9, 2002.

BACKGROUND OF THE INVENTION

1. Field of the Invention

The present invention relates to security control and communication systems and methods in which the functions of a security system control panel are integrated with a radio transceiver to provide protection against burglary, fire and other emergency conditions.

2. Discussion of the Prior Art

Security control systems currently fall into two main categories, self-contained security control systems and traditional two-box configurations for security control systems.

Self-contained security control systems comprise a keypad-like package which combines a control panel, a short-range radio frequency (RF) receiver, a keypad, a sounder (loud audible device) and a communicator. The keypad-like package is mounted in visible plain site at a convenient location or multiple locations throughout a premises. A self-contained security system is operated by an AC power supply with a plug-in external transformer. A backup battery is also provided to maintain the system operational in the event of a power outage. This type of system configuration is very convenient, but suffers from a major security problem. If the keypad-like package is damaged or destroyed, as by an intruder, the security system can become non-functional. Such self-contained systems typically contain a delay feature before arming the alarm system in order to allow a user to exit the premises or to enter a preset code to disarm the system when entering the premises. Since the delay feature may produce audible beeps to warn the user, it also draws attention to the location of the keypad-like package containing the control panel. If the control panel in the keypad-like package is damaged or destroyed by an intruder during the expiration of the delay, the security system can be effectively defeated.

In traditional two-box configurations, a separate metal box houses the control processor, the battery and the communicator. The separate metal box is typically mounted in an inconspicuous location, such as in a closet, basement or attic. Keypads, short-range radio (RF) receivers and sounders are generally mounted separately in more strategically relevant and visible locations. While providing much higher levels of security, such configurations are much more labor intensive to install and are thus more costly.

A typical self-contained system is primarily an RF-based system having wireless RF communicating remote sensors. A self-contained system may contain a small number of hard-wired inputs to the control panel. Traditional two-box configurations are generally hybrid systems, in that they contain both hard-wired and wireless RF sensors and accessories.

Both types of systems have an additional common problem. Both types of systems are based on POTS dial-up hard-wire communications (i.e. normal analog dial-up communications) as their primary communications technology, which requires that they be wired at the entry point for phone service to the premises. This wiring arrangement permits "line seizure", a condition wherein the alarm control can effectively disconnect all of the downstream telephone service to the premises and capture the line for its own purposes in order to permit uninterrupted communications during a security event. While this is the conventional and best method commonly used today, the installation and wiring of such a system is difficult, time consuming and expensive, and presents a potential operating inconvenience for the user. During a security event, when the user might likely be attempting to contact the central station, or the central station might be attempting to contact the user in order to avoid a false alarm and dispatching of the police or fire department, the phone line is seized by the security system and is unavailable for such communications.

In addition to the problems associated with wiring and line seizure, a more basic problem exists in the fact that the dial-up hard-wire line is very easy to defeat. The line can be cut easily by any of a number of different means, and most security systems do not monitor the status of the phone line. The security systems that do monitor the status of the phone line are plagued with false alarms, since most phone outages do not result from a security incident, but instead are caused by issues with the phone company such as storms, accidents, maintenance, etc. Accordingly, there is no suitable response to each such event from the security monitoring company, as central station personnel can't call the local police every time the phone is out. Moreover, monitoring the phone line is not the critical issue, which is making sure that a security incident is reported, even if it is accomplished redundantly.

This problem can be solved by a radio communication system that includes a low cost, long range radio transceiver at the user's site and a communications infrastructure that is capable of delivering an alarm signal to the central station in seconds. Such a system network can be set up in any defined geographical area, such as anywhere in North America. The system can be configured to provide a service that "supervises" the proper functioning of the radios it monitors, notifying the central station only if there is a communications problem. A variety of services are also available that permit central stations and dealers to sell radios, and to report alarms through those services.

One type of radio communication system uses the control channels of an analog cellular telephone network to communicate. It essentially utilizes the coverage of the cellular network, but doesn't have to place an actual phone call in order to communicate. Digital packets are sent from the user's system through the cellular network to an intermediate switching monitoring center, and then on to the central station. The intermediate center does not respond to alarms from the user's system, as that is the responsibility of the central station. It merely ensures that the radio communication portion of the user's system is functioning properly. This type of system overcomes some of the shortcomings discussed above and serves a certain niche in the marketplace, but is relatively expensive to install and maintain for the average user.

It has been suggested to combine a radio communication system in the separate metal box of the two-box configuration described above in order to reduce installation complexity and reduce costs. However, such a configuration does not accomplish this objective because there is no cost saving in hardware, and such a system would not work as well as it should. The radio communication device is more complex than the panel to which it is connected and requires its own power supply. In addition, the panel is typically mounted in a location that is not an optimal location for a radio device. The radio device is preferably mounted higher up near the outer walls of the premises, while the metal box is ideally mounted in an inconspicuous location such as in a closet or in a basement.

Ease of usage is another common problem encountered by security system users. Current systems have keypads with numeric keys and functions along with an LCD display that is typically two lines with sixteen characters per line. Users have to remember a code for arming and disarming the system, as well as procedures for a variety of functions. Most users find the procedures for functions too complex to fully utilize, as they essentially only want to be able to arm and disarm the security system. In order to simplify the system, the system can be equipped with a remote transmitter having RF keys (similar to a remote device for an automobile) that can arm and disarm the security system, turn on lights, open a garage door, etc. However, adding users, programming the system and other functions still require a keypad.

Another problem area involves installing and programming the security system. Most current security systems permit two programming/setup methods. The first method involves manual programming on a keypad. Each parameter is programmed individually with simple two-line programming. A skilled installer must program the system manually. The second method is called "downloading". This is accomplished by software that is present on a computer at a center station and contains forms and questions relating to the system's configuration. The user's configuration is then produced on a personal computer (PC). When complete, the configuration "memory map" is downloaded to the security system control over a telephone line and a built-in modem. This usually involves ringing the user's phone in some predetermined fashion and signaling the control to answer the phone in order to complete the download through the built-in modem.

A difficulty with this procedure is that it can only be accomplished by the central station after it receives all the data. While many configurations of parameters and setups can be accomplished by a system user having access to the system, only the central station can accomplish the downloading procedure. Thus, the user is limited to manual programming on a keypad.

SUMMARY OF THE INVENTION

The present invention provides an integrated security control system and method which integrate the functions of a wireless security system control panel and a radio transceiver in an integrated security control system unit which can be placed in a secure location. The invention provides for convenient programming of the wireless security system by an end user, and provides a wireless security system in which ease of installation is balanced against the security of a two-box design. The integrated security system control unit includes a first telephone communication system for communicating security system data by wired telephone communications through a first communication network. A second radio frequency (RF) cellular communication system is also provided for communicating security system data by communications through an RF communication network. The cellular communication system is the primary communication network for reporting a security event, thereby leaving the first telephone communication system open for telephone communications during the reporting of a security event. A control system determines under what circumstances communications are directed through the first telephone communication system and through the second RF communication system.

A separate unit of the security system, such as a wireless RF status display or a wireless RF keypad is provided with a beeper transducer for sounding entry and exit beeps, to alert a person entering the premises to disarm the security system, and to alert a person leaving the premises that the security system has been properly armed. The separate unit is positioned at a separate location from the integrated security control system unit, such that the entry beeps do not alert an entering person to the location of the integrated security control system unit, to prevent the entering person from possibly attempting to damage or destroy the integrated security control system unit.

For similar security reasons, the security system is preferably configured such that the component for disarming the security system by simply pressing a button, such a wireless RF keyfob or a wireless RF status display, is a separate component which is positioned at a separate nonobvious location from the component for arming the security system or having the beeper transducer.

The integrated security control system unit also includes a security alarm sounder, and when a person enters the premises, the beeper transducer in the separate unit emits entry beeps to alert the entering person to disarm the security system before the expiration of a given time period. During that time period the integrated security control system unit transmits an RF security message alerting a security service center of the entry and then awaits receiving back an acknowledge RF message acknowledging the successful receipt by the security service center of the security message. After receiving back the acknowledge RF message, if the entering person has not disarmed the alarm system within the given time period, the integrated security control system unit activates the alarm sounder to sound a security alarm. The arrangement is such that after the alarm sounder sounds a security alarm, even if the entering person attempts to damage or destroy the integrated security control system unit, the integrated security control system unit has already successfully transmitted a security alarm message.

The security control system is preferably provided in a compact housing with an AC plug at the back of the housing which can be plugged into an AC power receptacle at the premises being protected.

BRIEF DESCRIPTION OF THE DRAWINGS

The foregoing objects and advantages of the present invention for a security control and communication system and method may be readily understood by one skilled in the art with reference being had to the following detailed description of several embodiments thereof, taken in conjunction with the accompanying drawings wherein like elements are designated by identical reference numerals throughout the several views, and in which.

DETAILED DESCRIPTION OF THE INVENTION

Figure 1:
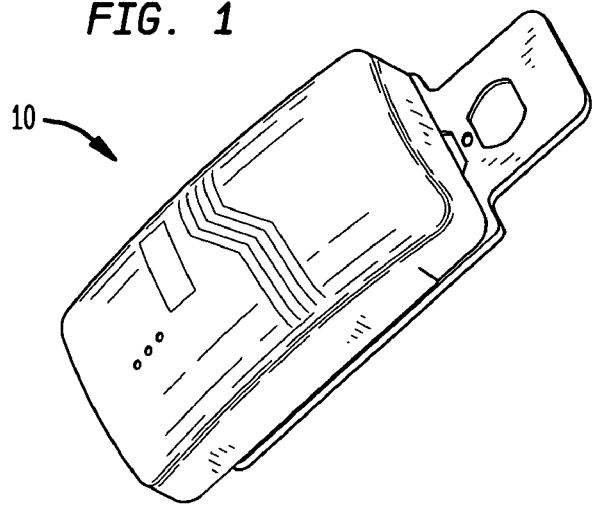
FIG. 1 is a front perspective view of a security system pursuant to the present invention.

The present invention provides an integrated security control and communication system having the functions of a security system control panel integrated into the base or platform of an RF transceiver in an integrated security control system unit 10. The unit 10 is preferably physically positioned at an inconspicuous location in a premises being protected by the security system which is also advantageous for the transmission and reception of RF signals. The functions of a security system control panel are integrated into the base or platform of an RF transceiver, rather than the opposite approach of integrating the functions of an RF transceiver into the base or platform of a security system control panel. This approach of the present invention results in an easier design of power supplies, and also allows placement of the integrated security control and communication system at a position which is more advantageous for the transmission and reception of RF signals.

A two-box system configuration includes an A/C power supply with an internal transformer, a backup battery, a short range radio transceiver, a long range radio transceiver, a sounder for sounding a security alarm, an interface control module (to control lighting and other non-security devices), a modem for downloading, a digital dialer, and optional line-seizure circuits.

A separate unit of the security system, such as a wireless RF keypad or a wireless RF status display unit, contains a beeper transducer for sounding entry and exit beeps so that a user is alerted upon entering the premises to disarm the security system, as by entering the proper security code in a wireless RF keypad or by pressing a disarm button on a wireless RF key fob, and is alerted upon leaving the premises that the security system has been properly armed. The beeper transducer is provided in a separate unit positioned at a separate location from the integrated control system unit 10, such that the entry beeps do not alert an intruder to the location of the integrated control system unit 10, to allow the intruder to attempt to damage or destroy the unit 10.

When a person enters the premises, the separate beeper unit emits entry beeps to alert the person that he or she has a given time period to disarm the security system, during which time period the integrated control system unit 10 transmits an RF security message alerting an outside service center of the entry and then awaits the receipt back of an acknowledge RF message acknowledging the successful receipt by the outside service center of the security message. After the receipt back of the acknowledge RF message, and if the entering person has not disarmed the alarm system within the given time period, the integrated control system unit 10 activates the sounder in the unit 10 to sound a security alarm. With this type of operation, after the sounder sounds a security alarm and thus alerts the enterer to the location of the unit 10, even if the enterer attempts to damage or destroy the unit 10, the unit 10 has already successfully dispatched a security alarm message.

Figure 2:
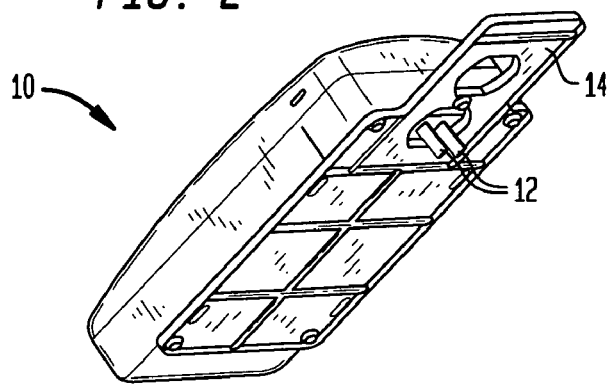
FIG. 2 is a rear perspective view of the security system of FIG. 1, and illustrates an A/C plug for mounting directly into an A/C outlet.

FIGS. 1 and 2 are respective front and rear perspective views of one embodiment of the integrated security control system 10. FIG. 2 illustrates the simplicity of installing the system by simply inserting an A/C plug 12 at the back of the unit into an A/C outlet receptacle located anywhere in the premises being secured.

Figure 3:
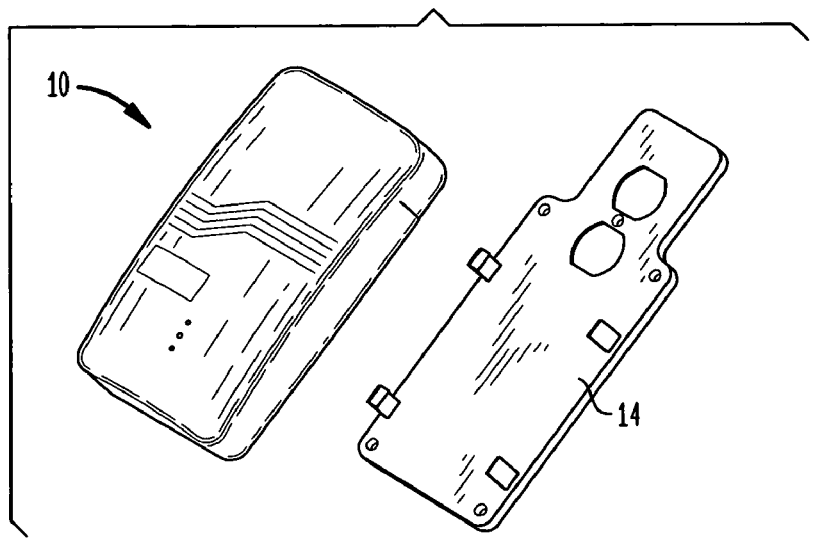
FIG. 3 is a front perspective view of the security system of FIGS. 1 and 2 showing the mounting plate separated from the security system.

FIG. 3 shows the security control system 10 with a back mounting plate 14 shown separated from the back of the unit. In some embodiments, a complementary wall-mounting bracket (not shown) mounted directly on or into an electrical outlet box can replace the wall outlet receptacle cover plate 14. The wall-mounting bracket can contain conventional locking tabs for securing the security control system 10 to the bracket and wall. The system can be designed to include a feature whereby once the system is plugged onto an A/C outlet receptacle and locked onto the mounting bracket, if the unit is removed from the receptacle and disengaged from the bracket, an alarm signal is triggered to indicate that the system has been tampered with. Various configurations of the mounting plate 14 and mounting brackets are available to accommodate a variety of different outlet receptacle configurations.

Figure 4:
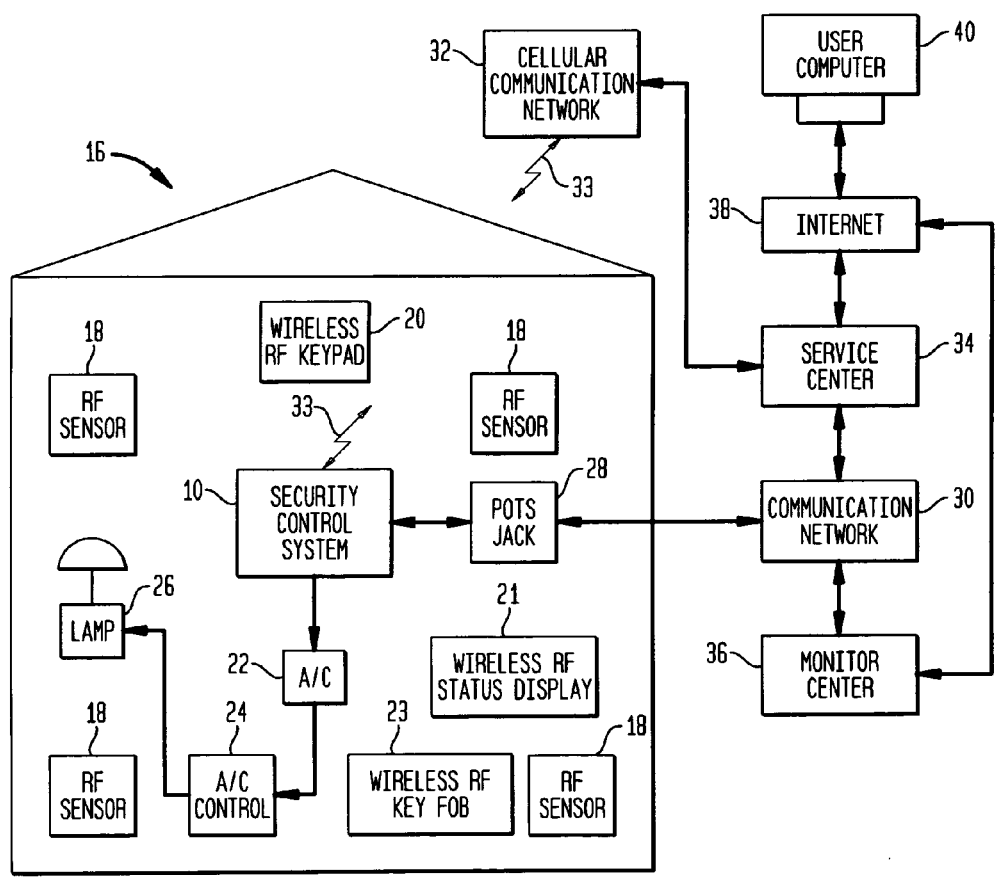
FIG. 4 is a schematic illustration and block diagram of a security system pursuant to the present invention, and shows the components of the security system at a premises being secured and connections to a service center and a monitoring center.

FIG. 4 illustrates premises 16 having an installed security control and communication system which consists of a self-contained integrated security control system unit 10 and wireless RF local sensors 18. As previously discussed, the integrated security control system unit 10 is preferably placed at an inconspicuous location on the premises in order to prevent possible tampering and incapacitation of the system during a security event. Typical sensors 18 can include door contacts, window contacts, motion sensors, fire or smoke sensors, shock sensors and glass break sensors, which unidirectionally transmit data to the security control system 10.

In addition, one or more wireless RF keypads 20 with an RF transceiver can be placed conveniently throughout the premises at a separate location from the integrated security control system unit 10. The wireless RF keypad 20 bidirectionally communicates with the control system 10. One example of such a wireless system is the 5800 series made by ADEMCO, a division of Honeywell Corporation. The wireless RF keypad can be used to arm and disarm the security system, and also to program the security system. The wireless RF keypad can also include an audible warning transducer for emitting audible entry and exit beeps, in which case it would be an always-on device and would be positioned at a separate location from the unit 10.

A wireless RF status display unit 21 may also be placed conveniently throughout the premises at a separate location from the security system 10 and includes a battery-operated display and an RF transceiver for bidirectionally communicating with the control system 10. The unit 21 may be placed in a convenient location on the premises, such as on a counter top or mounted on a wall. The status display unit provides a convenient display of system status, such as system readiness, any possible open zones or points of entry, the cause of the last alarm, etc. The wireless RF status display unit 21 can also include an audible warning transducer for emitting audible entry and exit beeps, in which case it would be an always-on device and would be positioned at a separate location from the unit 10.

Either the wireless RF keypad 20 or the status display unit 21 can include an audible warning transducer beeper device to provide the function of producing entry and exit warning beeps, so that a user can exit and reenter the premises without triggering a security event, in which case it would be an always-on device.

The security control system 10 receives its primary power from any A/C power receptacle 22 connected to an A/C power line in the premises, and also includes a back up battery for continued operation during power outages.

An A/C power line control module 24, which can utilize ADEMCO's X-10 line carrier communication protocol, may also be plugged into an A/C power receptacle on the same A/C power source, and thereby control a lamp 26 or other appliance in the premises.

The self-contained security control system 10 is also connected to a local POTS telephone service jack 28 for conventional modem and security digital dialer communications through a communication service network 30 operating in the local area, such as a conventional telephone service network and the internet.

Control system 10 communicates with its sensors 18, keypads 20, status displays 21, and wireless RF key fobs 23, which are wireless keys which unidirectionally transmit commands such as arm and disarm, by low power RF communications. The control system communicates outside the premises by conventional wired telephone dial-up communications, and also communicates outside the premises through an alternative primary communications network 32. In a preferred embodiment of the present invention, the alternative primary communications network 32 comprises a control channel cellular telemetry service, such as a offered by Aeris.Net of San Diego, Calif. Packets of data may be communicated as needed from control system 10 to network 32 by radio transmissions 33. Data packets are forwarded to a service center 34, which then sends messages through the communications network 30 to a monitoring center 36 that responds to the message.

For example, if a wireless sensor 18 is a smoke detector and is activated by a fire, a message is sent from sensor 18 to control system 10, which receives and interprets the message as a fire alarm. The control system 10 sends the alarm message by a radio transmission 33 to the communication network 32, which sends the alarm message to the service center 34, which in turn forwards the message through the communication network 30 to the monitoring center 36. The monitoring center 36 would then promptly notify the fire department to immediately dispatch help to the premises.

In a preferred embodiment, the service center 34 is the Alarm Net service from Honeywell international Inc., and the communication network 30 is either the internet or the Mobitex data network provided by Cingular Wireless Communications. If control system 10 is unable to deliver the alarm message by this primary wireless means, it can deliver the alarm message by a conventional security digital dialer through its connection to the POTS phone network through the service jack 28. The alarm message is then forwarded through the communication network 30 to the service center provider 34, and then through the communication network 30 to the monitoring center 36.

To enhance security, the security system is preferably configured such that the component for disarming the security system by simply pressing a button, such a wireless RF keyfob 23 or a wireless RF status display 21, is a separate component which is positioned at a separate nonobvious location from the component for arming the security system or having the beeper transducer.

Figure 5:
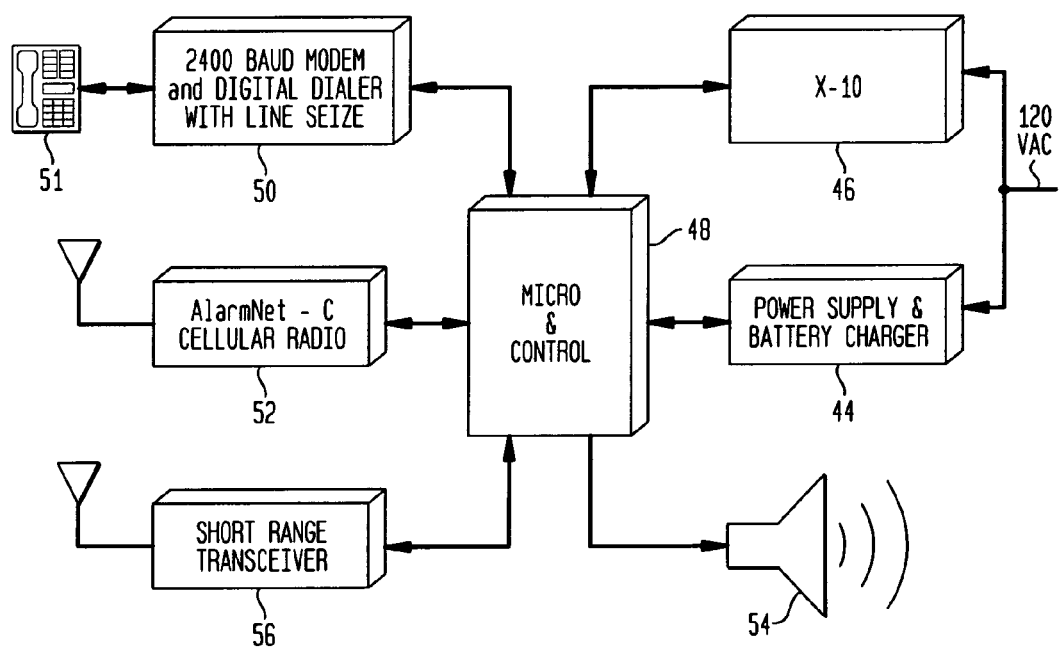
FIG. 5 is a block diagram of one embodiment of a security system pursuant to the present invention showing the major components of the security system.

FIG. 5 illustrates the control system 10, including a power supply/battery charger unit 44 and a lighting control unit 46, which receive power from a 120V AC source (outlet receptacle). The lighting control unit 46 can use well know X-10 technology to communicate and control other power line control modules, such as a module 24 shown in FIG. 4. Units 44 and 46 communicate with and are controlled by the microprocessor and control module 48, which sends control signals to units 44 and 46. Three other modules provide input signals to and receive output signals from module 48. A 2400 baud modem and digital dialer with optional line seizure module 50 and an AlarmNet-C cellular long range RF transceiver 52 provide secondary and primary security communications, as well as conventional modem communications with a programming service provided by the service center 34.

When an alarm event occurs, as described above, the cellular control channel communicator module 52 sends its signal to network 32, as shown in FIG. 4. If this communication fails, or if redundant communication is desired, the 2400 baud modem and digital dialer module 50 and telephone connection 51 provide a signal through communication network 30 when a security event is triggered at the premises. Control system 10 can be programmed or contain logic to determine under what circumstances such communications should occur and over which medium. A short range transceiver module 56 also provides input signals to and receives output signals from the microprocessor and control module 48, and provides short range RF communications within the components of the security system at the premises, such as RF communications from the wireless RF sensors and the wireless RF key fobs and RF communications with the wireless RF keypads and wireless RF status displays.

When a security event is triggered, the microprocessor and control module 48 controls the cellular module 52 and/or the digital dialer 50 to first place a call to the monitoring center 36 via the service center 34 to alert them of the security event, and then the microprocessor and control module 48 sends a signal to an audible alarm sounder 54 to alert persons in the general vicinity of the premises.

In conventional security systems, a security event will directly trigger an audible sounder on the premises, such a sounder 54. One of the disadvantages of this type of setup is that the sounder may be located at or near the alarm control panel. In such a case, the audible sound draws attention to the location of the control panel and can possibly permit an intruder to damage or destroy the alarm system before it has successfully communicated its message to the monitoring center 36.

In a security system according to the present invention, a separate unit of the security system, such as the wireless RF keypad 20 or the wireless RF status display unit 21, contains a beeper transducer for sounding entry and exit beeps so that a user is alerted upon entering the premises to disarm the security system, as by entering the proper security code in the wireless RF keypad 20 or by pressing a disarm button on a wireless RF key fob 43, and is alerted upon leaving the premises that the security system has been properly armed. The beeper transducer is provided in a separate unit separate from the integrated control system unit 10, such that the entry beeps do not alert an intruder to the location of the integrated control system unit 10, to allow the intruder to possibly attempt to damage or destroy the unit 10.

When a person enters the premises, the separate beeper unit emits entry beeps to alert the person that he or she has a given time period to disarm the security system, during which time period the integrated control system unit 10 transmits an RF security message alerting an outside service center of the entry and then awaits the receipt back of an acknowledge RF message acknowledging the successful receipt by the outside service center of the security message. After the receipt back of the acknowledge RF message, and if the entering person has not disarmed the alarm system within the given time period, the integrated control system unit 10 activates the sounder in the unit 10 to sound a security alarm. With this type of operation, after the sounder sounds a security alarm and thus alerts the enterer to the location of the unit 10, even if the enterer attempts to damage or destroy the unit 10, the unit 10 has already successfully dispatched a security alarm message.

The present invention delays actuation of the audible sounder 54 until after the cellular module has finished transmitting the alarm message through the cellular radio network. The result is that once the sounder is audible, the system can no longer be defeated since the alarm message has already been sent. Such a delay is not practical in a conventional dial-up system as its primary method of communication is typically a digital dialer, which is a slow device that can take between thirty seconds and many minutes to complete its communication task. It would therefore not be practical to delay the audible signal from the sounder until the completion of that task.

The security system of the present invention may be manually programmed by the installer in a conventional manner on a wireless keypad 20, or by downloading of security and configuration data from the monitoring center 36 by a conventional telephone communications network 30 to the control system 10.

A preferred method of programming the security system is via the internet and the world-wide web. A web site hosted by the system service center 34 can be accessed through the internet 38 to provide both the monitoring center 36 and an end-user computer 40 with access to their respective configuration information, both for information and for programming purposes. The monitoring center 36 typically controls what features and data the end-user has access to and can program through computer 40 and the internet 38. The end-user computer 40 and/or monitoring center 36 are supplied with forms and tables to enable a complete system feature configuration via their web browsers. This frees the monitoring center from having to maintain current download software and the end-user's configuration data. In addition, since access can be granted directly to the end-user, many programmable functions can now be delegated to the enduser so that the monitoring center does not have to be an intermediary.

The following is a preferred method of installing and programming the security system by a downloading operation, and avoids the problems and disadvantages of prior art downloading operations wherein the monitor center must ring the user's phone in some predetermined fashion, to avoid problems, such as with an answering machine for example, to signal the control system to answer the phone in order to complete a download operation through the built-in modem. The configuration data is stored by the service center 34. On command, the service center signals the control system 10 through radio communications network 32 that configuration data is waiting to be programmed. The control system 10 then initiates the telephone call and dials the service center 34 through the telephone network 30 to complete a secure data connection using the modem module 50 shown in FIG. 5. The control system 10 can then receive updated parameters, as well as other useful user content, such as weather, reminders, stock prices, etc.

The security system according to the present invention provides the following advantages over the prior art:
    single plug-in package;
    all wireless devices (hard-wired phone connection optional);
    integral long range radio communications (faster primary alarm delivery);
    line seizure is not required as a radio is the primary means of communication (the phone line remains free during a security event);
    no separate sounder is needed;
    no keypads are needed for basic operation (no user codes are needed, with concept being a user governed by wireless keys, not by conventional "user numbers" entered on a conventional key pad);
    system retains high security feature of two-box configuration;
    easier to install than conventional self-contained systems;
    system downloadable through a web-based service;
    system can be signaled from a central station to call out (via radio) without ringing the user's phone;
    system can be mounted securely in living areas (favorable locations for sounder, short range RF reception and long range RF communication);
    user interaction is greatly simplified (the primary interface is wireless key, and primary status and delay beeps are provided by a low-cost display for wall mounting or tabletop placement);
    system contains built in lighting control unit;
    code is contained in flash memory and is able to be upgraded through a web-based service over the phone; and
    system is simple enough to be installed by a user while still providing professional class security.

Possible additional options could be added to the display unit including buttons to:
    arm the system (without violating system security by arming without a key or user code),
    such as at night on a display unit on a nightstand;
    bypass open zones;
    request past alarm data for review;
    turn lights off or on; and
    provide voice prompts and or status information.

While several embodiments and variations of the present invention for a security control and communication system and method are described in detail herein, it should be apparent that the disclosure and teachings of the present invention will suggest many alternative designs to those skilled in the art.

What is claimed is:

1. An integrated security control and communication system comprising:
    an integrated security control system unit including a first telephone communication system for communicating security system data by wired telephone communications through a first communication network, and a second radio frequency (RF) communication system for communicating security system data by communications through an RF communication network, wherein the second RF communication system is the security system primary communication network for reporting a security event, thereby leaving the first telephone communication system open for telephone communications during the reporting of a security event, and a control system for determining under what circumstances communications are directed through the first telephone communication system and through the second RF communication system;
    a separate unit of the security system includes a beeper transducer for sounding entry and exit beeps, to alert a person entering the premises to disarm the security system, and to alert a person leaving the premises that the security system has been properly armed, wherein the separate unit is positioned at a separate location from the integrated security control system unit, such that the entry beeps do not alert an entering person to the location of the integrated security control system unit, to prevent the entering person from possibly attempting to damage or destroy the integrated security control system unit, wherein the integrated security control system unit includes a security alarm sounder, and when a person enters the premises, the beeper transducer in the separate unit emits entry beeps to alert the entering person to disarm the security system before the expiration of a given time period, during which time period the integrated security control system unit transmits an RF security message alerting a security service center of the entry and then awaits receiving back an acknowledge RF message acknowledging the successful receipt by the security service center of the security message, and after receiving back the acknowledge RF message, if the entering person has not disarmed the alarm system within the given time period, the integrated security control system unit activates the alarm sounder to sound a security alarm, such that after the alarm sounder sounds a security alarm, even if the entering person attempts to damage or destroy the integrated security control system unit, the integrated security control system unit has already successfully transmitted a security alarm message.

2. The system of claim 1, wherein the integrated security control system unit includes a microprocessor and control unit coupled to a modem and digital dialer unit, a long range cellular RF transceiver, a short range RF transceiver, a power supply and battery charger unit, and a security alarm sounder for sounding an alarm when a security event is detected.

3. The system of claim 2, wherein the microprocessor and control unit is further coupled to a fixture power line control unit which uses a power line carrier communication protocol to communicate with and control other power line control units over the AC power supply line.

4. The system of claim 2, wherein when a security event is triggered, the control unit delays activating the security alarm sounder until the second RF communication system has finished transmitting the alarm message.

5. The system of claim 1, wherein the security system further includes a short range RF transceiver for communicating with other components of the security system.

6. The system of claim 5, wherein the separate unit comprises a wireless RF keypad which bidirectionally communicates with the short range RF transceiver.

7. The system of claim 5, wherein the separate unit comprises a wireless RF status display which bidirectionally communicates with the short range RF transceiver.

8. The system of claim 5, further including a wireless RF key unit for transmitting arm and disarm messages to the short range RF transceiver.

9. The system of claim 1, further including a security system housing for enclosing the integrated security system control unit, wherein the housing includes an AC plug projecting from a back of the housing which plugs into an AC outlet receptacle to provide primary power for the integrated security control system unit, and the integrated security control system unit also includes a back up battery for continued operation during a power outage.

10. The system of claim 1, wherein the integrated security control system unit further includes an AC power line control module which uses a power line carrier communication protocol to control at least one appliance in a premises protected by the security system.

11. The system of claim 1, wherein the second RF communication system comprises a long range RF transceiver and a control channel cellular RF communication network which forwards data packets of a security message to a security service center, which then sends a security message through a separate communication network to a security monitor center which responds to the security message with an appropriate security action.

12. The system of claim 1, wherein the first telephone communication system includes a modem and digital dialer to provide bi-directional telephone communications.

13. A method of operating an integrated security control and communication system comprising:
providing an integrated security control system unit with a first telephone communication system for communicating security system data by wired telephone communications through a first communication network, and a second radio frequency (RF) communication system for communicating security system data by communications through an RF communication network;
utilizing the second RF communication system as the security system primary communication network for reporting a security event, thereby leaving the first telephone communication system open for telephone communications during the reporting of a security event;
controlling which communications are directed through the first telephone communication system and which communications are directed through the second RF communication system;
providing a separate unit of the security system with a beeper transducer for sounding entry and exit beeps, to alert a person entering the premises to disarm the security system, and to alert a person leaving the premises that the security system has been properly armed;
positioning the separate unit at a separate location from the integrated security control system unit, such that the entry beeps do not alert an entering person to the location of the integrated security control system unit, to prevent the entering person from possibly attempting to damage or destroy the integrated security control system unit; and
providing the integrated security control system unit with a security alarm sounder, and when a person enters the premises, the beeper transducer in the separate unit emits entry beeps to alert the entering person to disarm the security system before the expiration of a given time period, during which time period the integrated security control system unit transmits an RF security message alerting a security service center of the entry and then awaits receiving back an acknowledge RF message acknowledging the successful receipt by the security service center of the security message, and after receiving back the acknowledge RF message, if the entering person has not disarmed the alarm system within the given time period, the integrated security control system unit activates the alarm sounder to sound a security alarm, such that after the alarm sounder sounds a security alarm, even if the entering person attempts to damage or destroy the integrated security control system unit, the integrated security control system unit has already successfully transmitted a security alarm message.

14. The method of claim 13, including providing the integrated security control system unit with an AC power line control module which uses a power line carrier communication protocol to control at least one appliance in a premises protected by the security system.

15. The method of claim 13, wherein a component of the security system for disarming the security system by simply pressing a button is a separate component which is positioned at a separate nonobvious location from a component for arming the security system or having the beeper transducer.

16. The method of claim 13, wherein the second RF communication system comprises a long range RF transceiver and a control channel cellular RF communication network which forwards data packets of a security message to a security service center, which then sends a security message through a separate communication network to a security monitor center which responds to the security message with an appropriate security action.

17. The method of claim 13, including providing the first telephone communication system with a modem and digital dialer to provide bi-directional telephone communications.

18. The method of claim 13, including providing the security system with a short range RF transceiver for communicating with other components of the security system.

19. The method of claim 18, including providing the separate unit as a wireless RF keypad which bidirectionally communicates with the short range RF transceiver.

20. The method of claim 18, including providing the separate unit as a wireless RF status display which bidirectionally communicates with the short range RF transceiver.

21. The method of claim 18, including providing a wireless RF key unit for transmitting arm and disarm messages to the short range RF transceiver.

22. The method of claim 13, including providing a security system housing for enclosing the integrated security system control unit with an AC plug projecting from a back of the housing, and plugging the AC plug into an AC outlet receptacle to provide primary power for the integrated security control system unit, and providing the integrated security control system unit with a back up battery for continued operation during a power outage.

23. A method of programming an integrated security control system unit including a telephone communication system for communicating security system data by wired telephone communications through a communication network, the method comprising:
  providing a web site hosted by a security system service center, and storing configuration data at the web site which can be accessed through the internet;
  accessing the web site through the internet by a web browser of a security system end user computer to provide access to end user configuration data, both for security system information and for programming of the security system;
  the control system initiates a telephone call through the telephone communication system to access the security system service center through the telephone network to complete a secure data connection to transmit updated configuration data to the control system.

24. The method of claim 23, wherein a security system monitoring center controls what features and data the end user can access through the end user computer and the internet.

25. The method of claim 23, wherein the end user computer and a security system monitoring center are supplied with forms and enables a complete system feature configuration via their web browser.

26. A method of programming an integrated security control system unit including a first telephone communication system for communicating security system data by wired telephone communications through a first communication network, and a second radio frequency (RF) communication system for communicating security system data by communications through a radio frequency (RF) communication network, wherein the second RF communication system is the security system primary communication network for reporting a security event, thereby leaving the first telephone communication system open for telephone communications during the reporting of a security event, and a control system for determining under what circumstances communications are directed through the first telephone communication system and through the second RF communication system, the method comprising:
  providing a web site hosted by a security system service center, and storing configuration data at the web site which can be accessed through the internet;
  accessing the web site through the internet by a web browser of a security system monitoring center to provide access to security system monitoring center configuration data, both for security system information and for programming of the security system;
  accessing the web site through the internet by a web browser of a security system end user computer to provide access to end user configuration data, both for security system information and for programming of the security system;
  the security system service center signals the control system through the radio communication network that configuration data is waiting to be downloaded to program the control system;
  the control system then initiates a telephone call through the first telephone communication system to access the security system service center through the telephone network to complete a secure data connection to transmit updated configuration data to the control system.

27. The method of claim 26, wherein the end user computer and the security system monitoring center are supplied with forms and tables to enable a complete system feature configuration via their web browsers.

28. The method of claim 26, wherein the security system monitoring center controls what features and data the end user can access through the end user computer and the internet.

29. A method of programming an integrated security control system unit including a telephone communication system for communicating security system data by wired telephone communications through a communication network, the method comprising:
  providing a web site hosted by a security system service center, and storing configuration data at the web site which can be accessed through the internet;
  accessing the web site through the internet by a web browser of a security system monitoring center to provide access to security system monitoring center configuration data, both for security system information and for programming of the security system; and
  a communication is initiated through the telephone communication system to access the security system service center through the telephone network to complete a secure data connection to transmit updated configuration data to the control system.

30. The method of claim 29, wherein an end user computer and the security system monitoring center are supplied with forms and tables to enable a complete system feature configuration via their web browsers.

31. The method of claim 29, wherein the security system monitoring center controls what features and data the end user can access through an end user computer and the internet.

* * * * *